United States Patent
Ortega et al.

(10) Patent No.: US 7,542,978 B2
(45) Date of Patent: Jun. 2, 2009

(54) AUCTION NOTIFICATION SYSTEM

(75) Inventors: Ruben E. Ortega, Seattle, WA (US); Alexandre Edelman, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 283 days.

(21) Appl. No.: 10/337,439

(22) Filed: Jan. 6, 2003

(65) Prior Publication Data

US 2003/0097376 A1 May 22, 2003

Related U.S. Application Data

(63) Continuation of application No. 09/344,601, filed on Jun. 25, 1999, now Pat. No. 6,549,904.

(51) Int. Cl.
*G06F 17/00* (2006.01)

(52) U.S. Cl. .................. 707/101; 707/100; 707/102

(58) Field of Classification Search ............ 707/3, 707/10, 103 R, 104.1, 100–102
See application file for complete search history.

(56) References Cited

U.S. PATENT DOCUMENTS

| | | | |
|---|---|---|---|
| 5,794,210 A | | 8/1998 | Goldhaber et al. |
| 5,898,836 A * | | 4/1999 | Freivald et al. ............. 709/218 |
| 5,999,915 A * | | 12/1999 | Nahan et al. .................. 705/27 |
| 6,041,308 A | | 3/2000 | Walker et al. |
| 6,064,979 A * | | 5/2000 | Perkowski ................... 705/26 |
| 6,085,176 A * | | 7/2000 | Woolston ..................... 705/37 |
| 6,202,051 B1 | | 3/2001 | Woolston |
| 6,208,996 B1 | | 3/2001 | Ben-Shachar et al. |
| 6,212,265 B1 | | 4/2001 | Duphorne |
| 6,233,566 B1 | | 5/2001 | Levine et al. |
| 6,243,691 B1 | | 6/2001 | Fisher et al. |
| 6,260,019 B1 * | | 7/2001 | Courts ........................... 705/1 |
| 6,260,024 B1 | | 7/2001 | Shkedy |
| 6,341,270 B1 | | 1/2002 | Esposito et al. |
| 6,415,320 B1 * | | 7/2002 | Hess et al. .................. 709/219 |

OTHER PUBLICATIONS

Gordon Padwick (Using Microsoft Outlook 98 and Padwick hereinafter; 1998, pp. 360, 361, 420, 426-428, 446 and 540).*

(Continued)

*Primary Examiner*—Sana Al-Hashemi
(74) *Attorney, Agent, or Firm*—Thomas, Kayden, Horstemeyer & Risley, LLP

(57) ABSTRACT

A method and system for generating notifications of auctions based on user notification requests. In one embodiment, the notification system receives from users selection specifications that specify the types of auctions for which the user is to be notified. The selection specifications may include a category of the auctions, keywords for identifying auctions, and values for attributes associated with the category. When the notification system receives a selection specification, it determines whether that selection specification is the same as or nearly the same as other selection specifications that have been received. The notification system periodically determines whether any new auctions satisfy a selection specification by submitting a query to an auction database and then notifies the users when new auctions are identified. The notification may include a list of auctions that is sorted based on access patterns of users who are presented with lists of auctions using selection specifications with similar category, attribute, or keyword values.

24 Claims, 11 Drawing Sheets

OTHER PUBLICATIONS

"Onsale's Smart Tools Enhances Online Auction Experience," Newsgroups: comp.internet.net-happenings, May 6, 1998 (2 pages).

"Onsale Exchange Enhanced with New Features," Newsgroups: comp.internet.net-happenings, Feb. 19, 1998 (2 pages).

"Envision Software is Introducing 'AuctionTamer,'" Newsgroups: alt.collecting, Jun. 24, 1999 (1 page).

"Streaming Auction," Newsgroups: infosystems.www.authoring. misc.comp.infosystems.www.authoring.site-design, May 5, 1998 (1 page).

"Welcome to the World of Silanta—Pioneering the Dynamic E-Commerce Revolution Since 1995," Procurement Software Solutions by Silanta Technologies, Copyright 1995-2004 (2 pages) http://www.auctionbroker.com.

* cited by examiner

Auction Notification Request

Enter keywords  [Barbie 1960]   101

Frequency  [Daily ▼]   102

(Submit Request)   103

```
                                                              200
┌─────────────────────────────────────────────────────────────────┐
│  From:      Auction Server                                      │
├─────────────────────────────────────────────────────────────────┤
│  To:        User                                                │
├─────────────────────────────────────────────────────────────────┤
│  Subject:   Open Auctions                                       │
├─────────────────────────────────────────────────────────────────┤
│                                                                 │
│        The following auctions have been identified as matching  │
│        your notification request of:                            │
│                                                                 │
│                    barbie 1960      ⁓ 201                       │
│                                                                 │
│        1960 Action Barbie                      ⁓ 202            │
│                                                                 │
│        Collector's Barbie                                       │
│                        ⋮                                        │
│        1960 Barbie                                              │
│                                                                 │
│        Select a link to go directly to the Auction              │
│                                                                 │
└─────────────────────────────────────────────────────────────────┘
```

*Fig. 2*

Category Request Table 601

| GRID | Category | AH1 | AH2 | ... |
|---|---|---|---|---|
| 15 | Barbie | good | | |
| 16 | Romance Novel | paperback | John Doe | |
| | | | | |

*Fig. 6*

AUCTION NOTIFICATION SYSTEM

CROSS-REFERENCE TO RELATED APPLICATION

This application is a continuation of U.S. patent application No. 09/344,601 entitled "AUCTION NOTIFICATION SYSTEM," filed on Jun. 25, 1999 now U.S. Pat. No. 6,549,904, which application is hereby incorporated by reference in its entirety.

TECHNICAL FIELD

The described technology relates generally to conducting electronic commerce and, more particularly, to providing notifications of transactions conducted over a computer network.

BACKGROUND

Because it facilitates electronic communications between vendors and purchasers, the Internet is increasingly being used to conduct "electronic commerce." The Internet comprises a vast number of computers and computer networks that are interconnected through communication channels. Electronic commerce refers generally to commercial transactions that are at least partially conducted using the computer systems of the parties to the transactions. For example, a purchaser can use a personal computer to connect via the Internet to a vendor's computer. The purchaser can then interact with the vendor's computer to conduct the transaction. Although many of the commercial transactions that are performed today could be performed via electronic commerce, the acceptance and wide-spread use of electronic commerce depends, in large part, upon the ease-of-use of conducting such electronic commerce. If electronic commerce can be easily conducted, then even the novice computer user will choose to engage in electronic commerce. Therefore, it is important that techniques be developed to facilitate conducting electronic commerce.

The Internet facilitates conducting electronic commerce, in part, because it uses standardized techniques for exchanging information. Many standards have been established for exchanging information over the Internet, such as electronic mail, Gopher, and the World Wide Web ("WWW"). The WWW service allows a server computer system (i.e., web server or web site) to send graphical web pages of information to a remote client computer system. The remote client computer system can then display the web pages. Each resource (e.g., computer or web page) of the WWW is uniquely identifiable by a Uniform Resource Locator ("URL"). To view a specific web page, a client computer system specifies the URL for that web page in a request (e.g., a HyperText Transfer Protocol ("HTTP") request). The request is forwarded to the web server that supports that web page. When that web server receives the request, it sends the requested web page to the client computer system. When the client computer system receives that web page, it typically displays the web page using a browser. A browser is typically a special-purpose application program that effects the requesting of web pages and the displaying of web pages.

Currently, web pages are generally defined using HyperText Markup Language ("HTML"). HTML provides a standard set of tags that define how a web page is to be displayed. When a user indicates to the browser to display a web page, the browser sends a request to the server computer system to transfer to the client computer system an HTML document that defines the web page. When the requested HTML document is received by the client computer system, the browser displays the web page as defined by the HTML document. The HTML document contains various tags that control the displaying of text, graphics, controls, and other features. The HTML document may contain URLs of other web pages available on that server computer system or other server computer systems.

The World Wide Web portion of the Internet is especially conducive to conducting electronic commerce. Many web servers have been developed through which vendors can advertise and sell product. The products can include items (e.g., music) that are delivered electronically to the purchaser over the Internet and items (e.g., books) that are delivered through conventional distribution channels (e.g., a common carrier). A server computer system may provide an electronic version of a catalog that lists the items that are available. A user, who is a potential purchaser, may browse through the catalog using a browser and select various items that are to be purchased. To facilitate the identifying of items, the catalog may be hierarchically organized. A user may browse through the hierarchy to find items of interest. When the user has completed selecting the items to be purchased, the server computer system then prompts the user for information to complete the ordering of the items. This purchaser-specific order information may include the purchaser's name, the purchaser's credit card number, and a shipping address for the order. The server computer system then typically confirms the order by sending a confirming web page to the client computer system and schedules shipment of the items.

The World Wide Web is also being used to conduct other types of commercial transactions. For example, server computer systems have been developed to support the conducting of auctions electronically. To conduct an auction electronically, the seller of an item provides a definition of the auction via web pages to a server computer system. The definition includes a description of the item, an auction time period, and optionally a minimum bid. The server computer system then conducts the auction during the specified time period. Potential buyers can search the server computer system for an auction of interest. When such an auction is found, the potential buyer can view the bidding history for the auction and enter a bid for the item. When the auction is closed, the server computer system notifies the winning bidder and the seller (e.g., via electronic mail) so that they can complete the transaction.

Because of the vast number of commercial transactions being conducted and because of the speed at which they are being conducted, it can be very difficult to identify transactions that may be of interest to a user. A user may identify auctions of interest by periodically accessing the auction web site and browsing through the categories of interest. Because of the large number of auctions that may be in a category, it may be difficult for a user to determine which auctions the user has already seen. If the links to the auctions are sorted by an ending time, then the auctions that the user has not yet seen may be interleaved with the auctions that the user has already seen. If the links to the auctions are sorted by starting time, then the auctions that have not yet been seen may be easily identified as long as the user remembers the last time that they accessed the web site. Even if the user can easily identify which auctions they have already seen, it may be inconvenient and frustrating to access the web site only to find that no new auctions of interest have been opened. Some web servers may automatically notify users via electronic mail when certain items become available. For example, when a new book is published, a web server through which books may be purchased may send an electronic mail message to each user who expressed an interest in books by the author of that newly published book. The frequency at which books are published pales in comparison to the frequency at which new auctions are opened. Thus, a different technique may be needed to notify users of certain high frequency transactions.

SUMMARY

A method and system for generating notifications of transactions based on user notification requests is provided. In one embodiment, the notification system receives from users selection specifications that specify the types of transactions for which the user is to be notified. The selection specifications may include a category of the transactions, keywords for identifying transactions, and values for attributes associated with the category. When the notification system receives a selection specification, it determines whether that selection specification is the same as or nearly the same as other selection specifications that have been received. The notification system may normalize the selection specifications so that selection specifications that are nearly the same can be identified. The notification system maintains a mapping of users to selection specifications. When multiple users specify similar selection specifications, the notification system maps each user to the same normalized selection specification. The notification system can identify transactions that match the normalized selection specifications and notify each of the users who are mapped to that selection specification. In this way, the notification system avoids re-identifying the new auctions for each of the multiple users who are mapped to the same selection specification. The notification system periodically determines whether any new transactions satisfy a selection specification by submitting a query to a transaction database and then notifies the users when new transactions are identified. The notification may include a list of transactions that is sorted based on access patterns of users who are presented with lists of transactions using selection specifications with similar category, attribute, or keyword values.

BRIEF DESCRIPTION OF THE DRAWINGS

FIG. 1 illustrates a display such as a web page for requesting auction notifications.

FIG. 2 illustrates a sample notification message that is sent via electronic mail to a user.

FIG. 6 is a block diagram illustrating a category request table.

DETAILED DESCRIPTION

Figure 3:
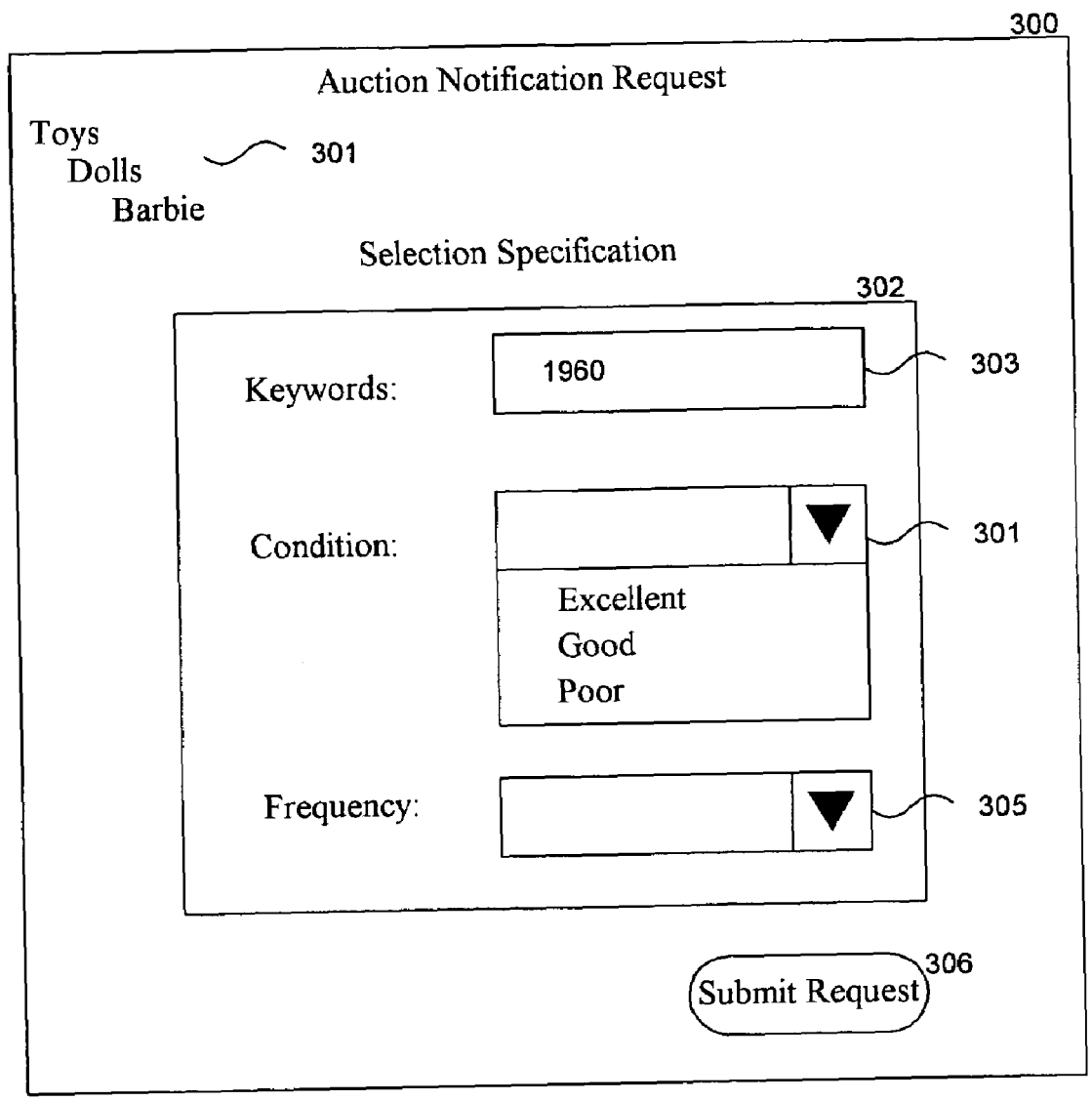
FIG. 3 illustrates a sample display for requesting auction notifications based on a category of auctions.

A method and system for providing transaction notifications that identify transactions for which the user has not yet been notified is provided. In one embodiment, the transactions are auctions, but one skilled in the art will appreciate that the techniques of the notification system can be used for many different types of transactions. The notification system allows a user to specify the types of auctions for which the user is to be notified. The user specifies the types of auctions by providing a selection specification. The selection specification may include one or more keywords, a category, and values of attributes related to that category. For example, a user may enter the keywords "Barbie" and "1960" to specify an interest in auctions relating to Barbie dolls of a 1960 vintage. Alternatively, if a "doll" category has a "Barbie" sub-category, then the user may enter a category of "Barbie" to specify an interest in auctions in that category. The user may also enter a keyword of "1960" to limit the auctions of interest within the "Barbie" category. When the notification system receives a selection specification, it normalizes the keywords. For example, it may convert the letters in the keywords to lower case and place the keywords in alphabetical order. The notification system then compares the selection specification with the keywords normalized to previously received selection specifications. If a matching selection specification is found, then another user previously submitted the same normalized selection specification. The notification system maps both of the users to the same selection specification. The notification system periodically determines, for each selection specification, whether any new auctions have been opened since the last determination that satisfy that selection specification. This determination may be made by submitting a query based on the selection specification to an auction database and receiving a query result that identifies the new auctions. Because multiple users can be mapped to a single selection specification, only one query needs to be submitted to identify the auctions of interest for all the users who are mapped to that selection specification. The notification system then notifies the users that are mapped to the specification that new auctions have been opened. This notification may be by sending to the users an electronic mail message that includes links to the auction web pages or by presenting to the users an indication when the users next access the web server. When a list of the new auctions is presented to a user, the list may be sorted based on web-page access patterns of users who were presented the results of a query that may be related to the selection specification. The web page access patterns may be based on query results generated by the notification system or by query results generated by a search engine of the auction web server. The use of such web page access patterns is more fully described in U.S. patent application Ser. No. 09/344, 802, entitled "Identifying Items Relevant to a Current Query Based on Items Accessed in Connection with Similar Queries," which is hereby incorporated by reference. The notification system may identify attributes that are related to a category that is specified by a user and then allow the user to specify values for those attributes as part of the selection specification. For example, a "condition" attribute may be related to a "doll" category, and the acceptable values for that attribute may be excellent, good, and poor. The notification systems uses those values when formulating a query to submit. The use of category-specific attributes is more fully described in U.S. patent application Ser. No. 09/344,787, entitled "Method and System for Price Suggesting Using Item-Specific Attributes," which is hereby incorporated by reference.

FIG. 1 illustrates a sample display of web page for requesting auction notifications. The display 100 includes a keyword field 101, a notification frequency field 102, and a submit request button 103. The display may be generated by a web server and sent to a client computer for display by a browser. A user enters the keywords of the selection specification into the keyword field. In this example, the user has entered the keywords "Barbie" and "1960." The user may select the frequency at which notifications of new auctions are to be sent. The notification frequency field may be a drop-down list of the available frequencies (e.g., daily or weekly). After the user has entered the keywords and frequency, the user selects the submit request button. In response, the user's browser then sends an HTTP-request message to the web server. The notification system of the web server then normalizes the keywords and stores the selection specification as described above. In this example display, the selection specification does not include a category selection. This web page may also include a field through which the user can specify when the notification system should stop sending the requested notifications. If the user does not indicate when to stop the notifications, the notification system may assume a default time (e.g., 1 month). Alternatively, the notification system may periodically send an electronic mail message asking the user if they still want to receive notifications. If the user does not respond to the electronic mail message, the notification system may cancel the notification request.

FIG. 2 illustrates a sample notification message that is sent via electronic mail to a user. In this example, the electronic mail message 200 includes an indication of the selection specification 201 and includes links 202 to the auction web pages that satisfy the selection specification. To identify the auctions that satisfy the selection specification, the server submits a query to an auction database and receives a query result that lists the auctions that satisfy the query. In this example, the query may specify to search for auctions that contain both "Barbie" and "1960" in a description field and to return links (e.g., URLs) to the web pages of the matching auctions along with titles for the auctions. The user can select one of links (represented by the auction title) to go directly to the auction web page. In one embodiment, the links to the auction web pages can be sorted based on access patterns of users who entered similar selection specification. The notification message may also include, when appropriate, an indication that the notifications will stop unless the user replies to the notification message or takes some other action.

FIG. 3 illustrates a sample display for requesting auction notifications based on a category of auctions. The display 300 includes a category hierarchy area 301, a selection specification area 302, and a submit request button 306. The selection specification area includes a keyword field 303, a condition field 304, and a notification frequency field 305. A user may browse through a category hierarchy to select a desired category for receiving notifications. In this example, the user has selected the "Barbie" sub-category of the "dolls" category, which is a sub-category of the "toys" category. The user may refine the selection specification of the category by entering keywords. For example, the user may enter the keyword "1960" to indicate an interest in only those auctions within the "Barbie" category that somehow relate to the year 1960. When a category is used in a specification, the notification system may display category-specific attributes for that category. The notification system may have an association between the categories and attributes. In this example, the notification system has an association between the "toy" category and a "condition" attribute. The notification system may display an input field for each associated attribute so that the user may refine the selection specification. The input field for an attribute may be a drop-down list that contains the possible values for the attributes. When submitting a query for a selection specification that includes a category and attribute, the notification system formulates the query to request auctions only in that category and with those attribute values.

Figure 4:
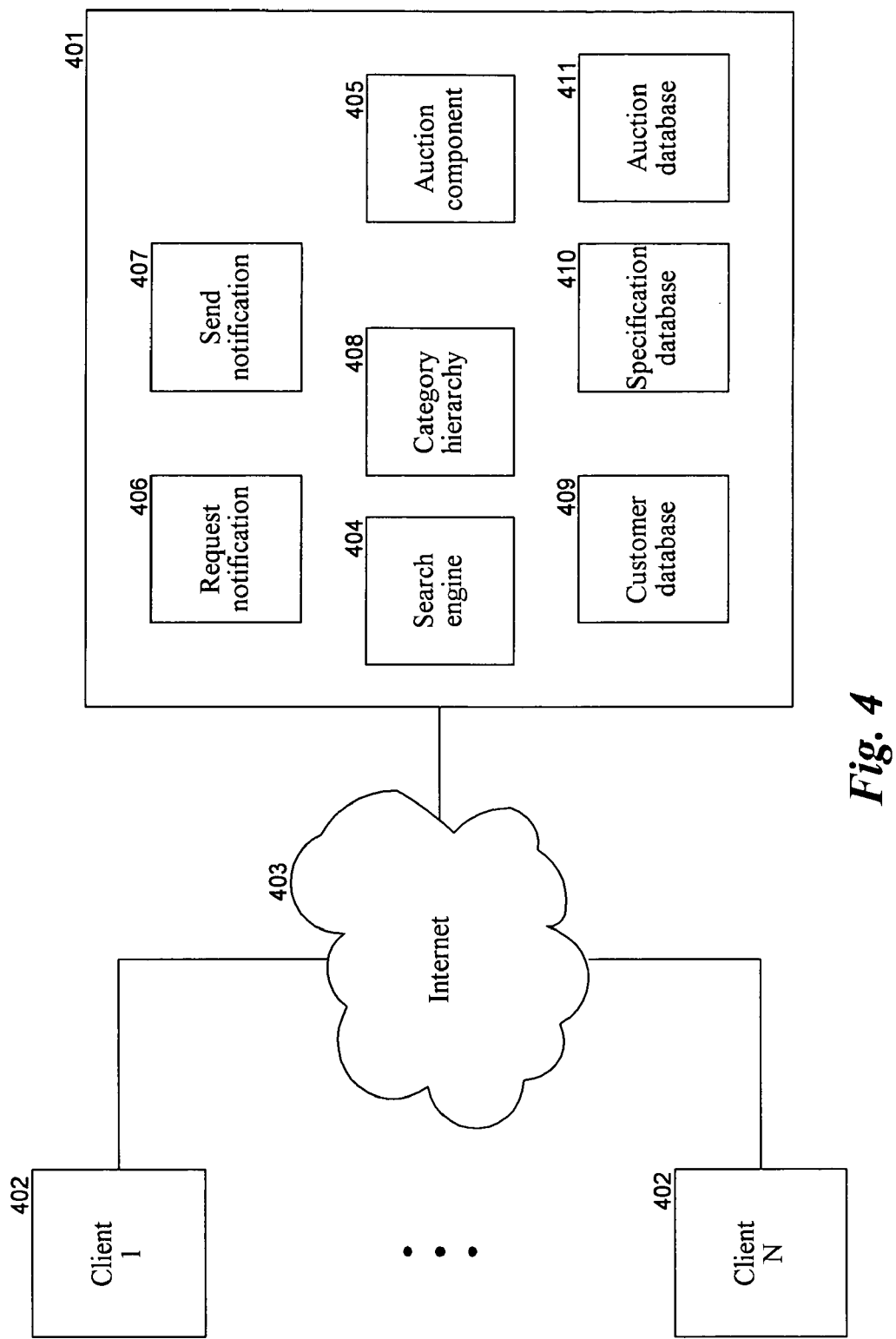
FIG. 4 is a block diagram illustrating components of the notification system in one embodiment.

FIG. 4 is a block diagram illustrating components of the notification system in one embodiment. The notification system 401 is connected to various client computer systems 402 through a communications network 403, such as the Internet. The notification system executes on a server computer system that may include a central processing unit, memory, and input/output devices. The components and data structures of the notification system may be stored on a computer-readable medium such as memory, a disk, or a CD-ROM and may be transmitted over a computer-readable transmission medium. The client computer systems may interact with the notification system using a standard web browser. The notification system includes a server engine 404, an auction component 405, a request notification component 406, and a send notification component 407. The notification system in this example also includes a category hierarchy 408, a customer database 409, a selection specification database 410, and a auction database 411. The search engine receives HTTP-request messages from the client computer systems and responds with HTTP-response messages. The auction component controls the conducting of auctions. The auction component allows sellers to list items and bidders to place bids on the items. The auction component stores information describing each auction in the auction database. When an auction closes, the auction component coordinates the concluding of the transaction. The request notification component inputs selection specifications from users and stores those selection specifications in the selection specification database. The send notification component periodically determines whether any new auctions satisfy each selection specification in the selection specification database. When a new auction is identified for a selection specification, the notification system notifies the users who are mapped to that selection specification. The category hierarchy defines a categorization of the auctions that can be used when browsing through auctions. The customer database contains information relating to the various users, such as their electronic mail addresses. The selection specification database contains information indicating which users have requested to receive notifications, the notification frequencies, and the selection specifications. One skilled in the art will appreciate that notification system may be implemented on networks that are not related to the Internet and on computers systems that may not be connected to networks.

Figure 5:
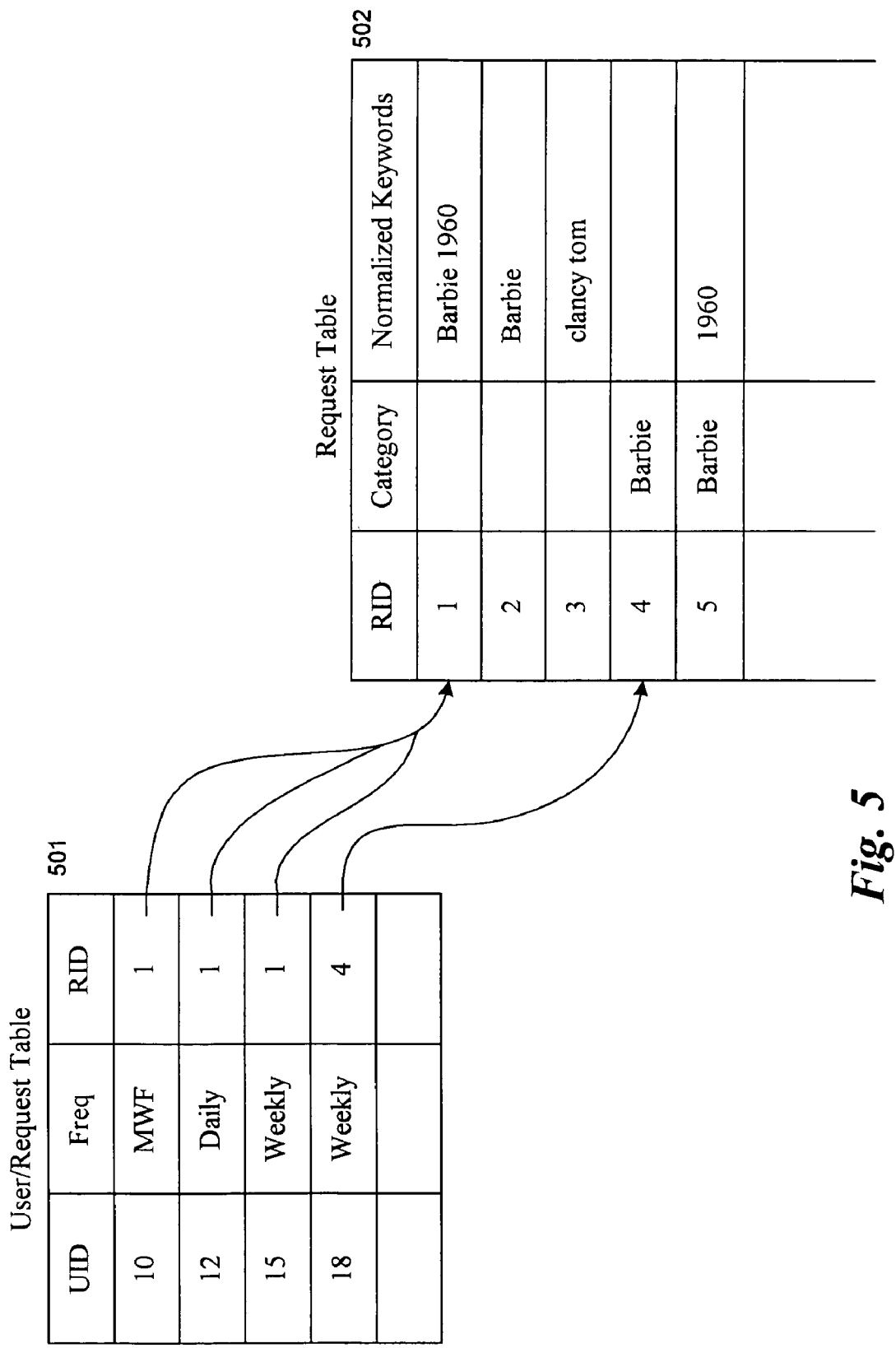
FIG. 5 is a block diagram illustrating tables of selection specification database.

FIG. 5 is a block diagram illustrating tables of the selection specification database. In this example, the selection specification database includes a user/request table 501 and a request table 502. A "request" corresponds to a selection specification. The request table includes an entry for each unique selection specification with normalized keywords. Each entry contains a unique request identifier ("RID") field, a category field, and a normalized keywords field. If the selection specification specifies a category, then the normalized keywords field may be empty. If the selection specification includes a category, then the category field contains an indication of that category (e.g., "Barbie"). Otherwise, the category field is empty. The user/request table contains an entry for each selection specification ("notification request") submitted by a user. Each entry contains a user identifier ("UID") field, a notification frequency field, and a request identifier field. The request identifier field of each entry in the user/request table points to a corresponding entry in the request table. In this example, the first three entries of the user/request table point to the same entry, the entry with a request identifier of 10, in the request table. The first three entries, which are for different users, also correspond to different notification frequencies. For example, user 10 has requested a notification frequency of Monday, Wednesday, and Friday; user 12 has requested a notification frequency of daily; and user 15 has requested in notification frequency of weekly.

FIG. 6 is a block diagram illustrating a category request table. In one embodiment, the request table may contain a category request identifier rather than the name of a category. The category request identifier is an index into the category request table 601. The category request table contains an entry for each unique combination of categories and attributes included in a notification request that includes a category specification. Each entry contains a category request identifier field, a category field, and attribute value fields. The attribute value fields contain the value specified by the user for those category-specific attributes. For example, the entry for category request identifier 15 indicates that the category is "Barbie" and that value of the "condition" attribute is "good." The entry for category request identifier 16 indicates that the category is "romance novels," that the value for the hardback/paperback attribute is "paperback," and that the value for the author attribute is "John Doe." One skilled in the art will appreciate that that many different organizations for the information in the selection specification database may be used. For example, the category request table may be integrated with the request table.

Figure 7:
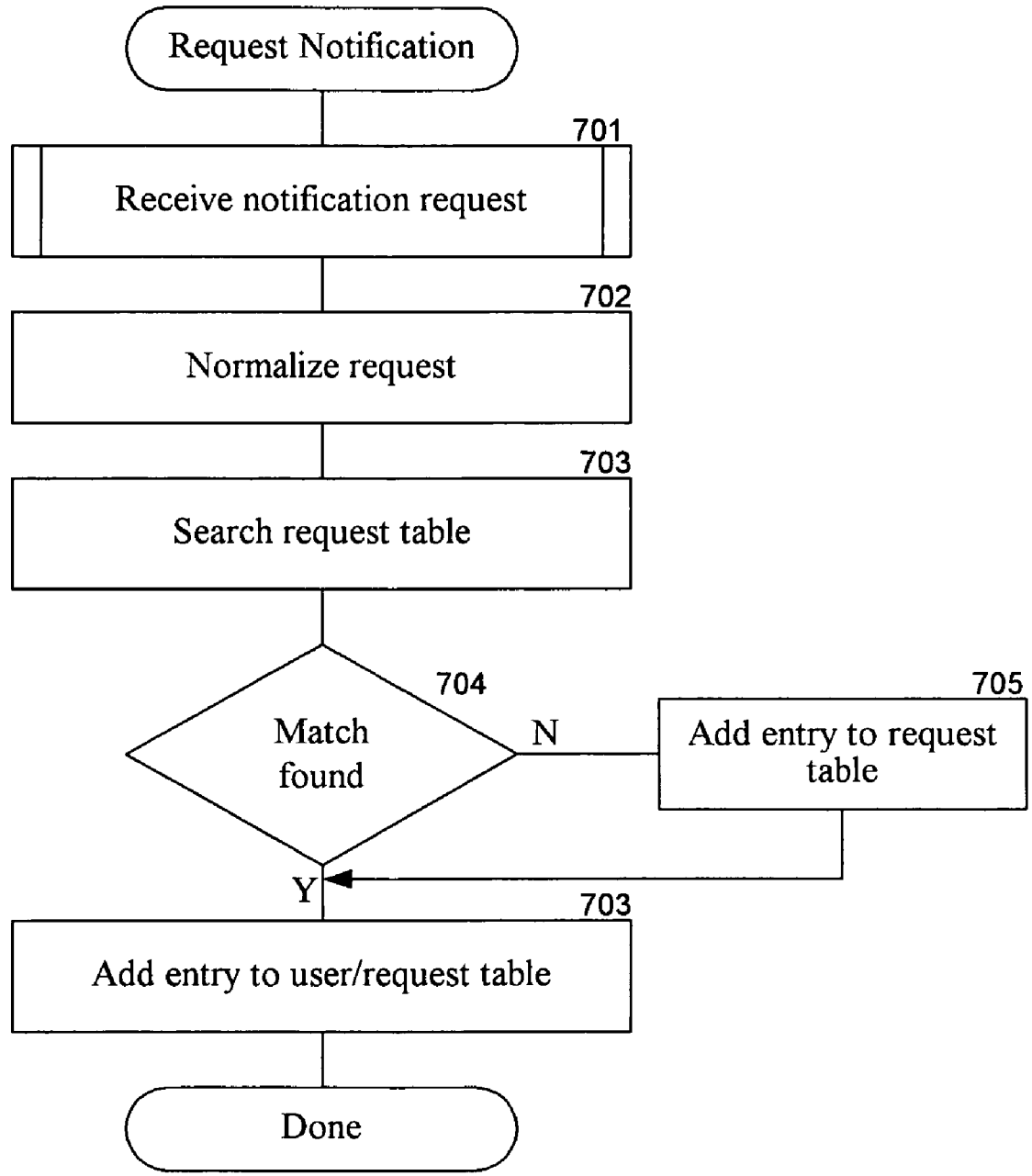
FIG. 7 is a flow diagram illustrating example processing of the request notification component.

FIG. 7 is a flow diagram illustrating example processing of the request notification component. This request notification function receives a notification request and stores information describing the notification request in the selection specification database. In step 701, the function receives a notification request as more fully described in FIG. 8. In step 702, the function normalizes the notification request. This normalization may include changing the keywords to lowercase and removing noise words. In step 703, the function searches the request table for a notification request that matches the normalized notification request. The request table may be indexed or sorted in various ways to assist the searching. In step 704, if a match is found, the function continues at step 706, else the function continues at step 705. In step 705, the function adds an entry to the request table for the normalized request. In step 706, the function adds an entry to the user/request table that includes a user identifier, the notification frequency specified by the user, and an identifier of the normalized request in the request table. The function then completes.

Figure 8:
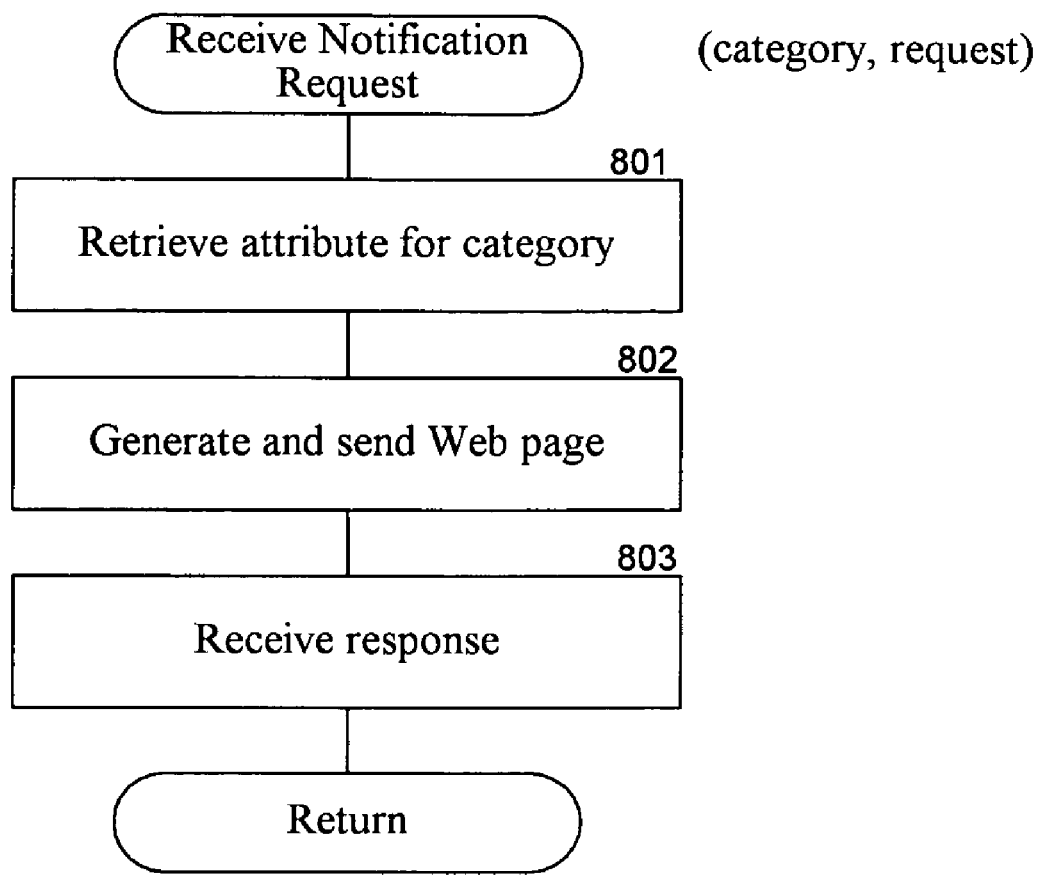
FIG. 8 is a flow diagram illustrating example processing of the receive notification request function.

FIG. 8 is a flow diagram illustrating example processing of the receive notification request function. This function may be passed a category indication and returns a notification request. In step 801, if a category is passed, the function retrieves any category-specific attributes associated with that category. In step 802, the function generates a web page for input of the notification request and then sends the generated web page to the user. In step 803, the function receives an HTTP-request message from the user that includes the notification request. The function then returns.

Figure 9:
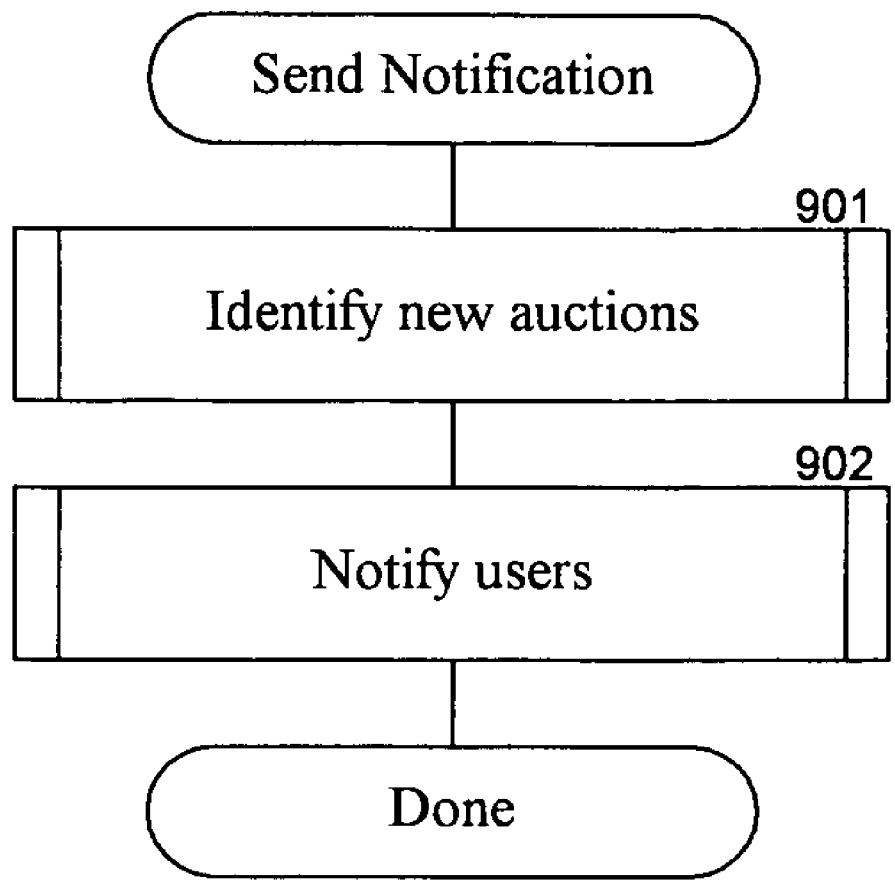
FIG. 9 is a flow diagram illustrating example processing of a send notification component.

FIG. 9 is a flow diagram illustrating example processing of a send notification component. The processing of this component may be performed on a periodic basis, such as daily. In step 901, the component invokes an identify new auctions function to identify new auctions for which users are to be notified. In step 902, the component invokes a notify users function to notify the users of the new auctions.

Figure 10:
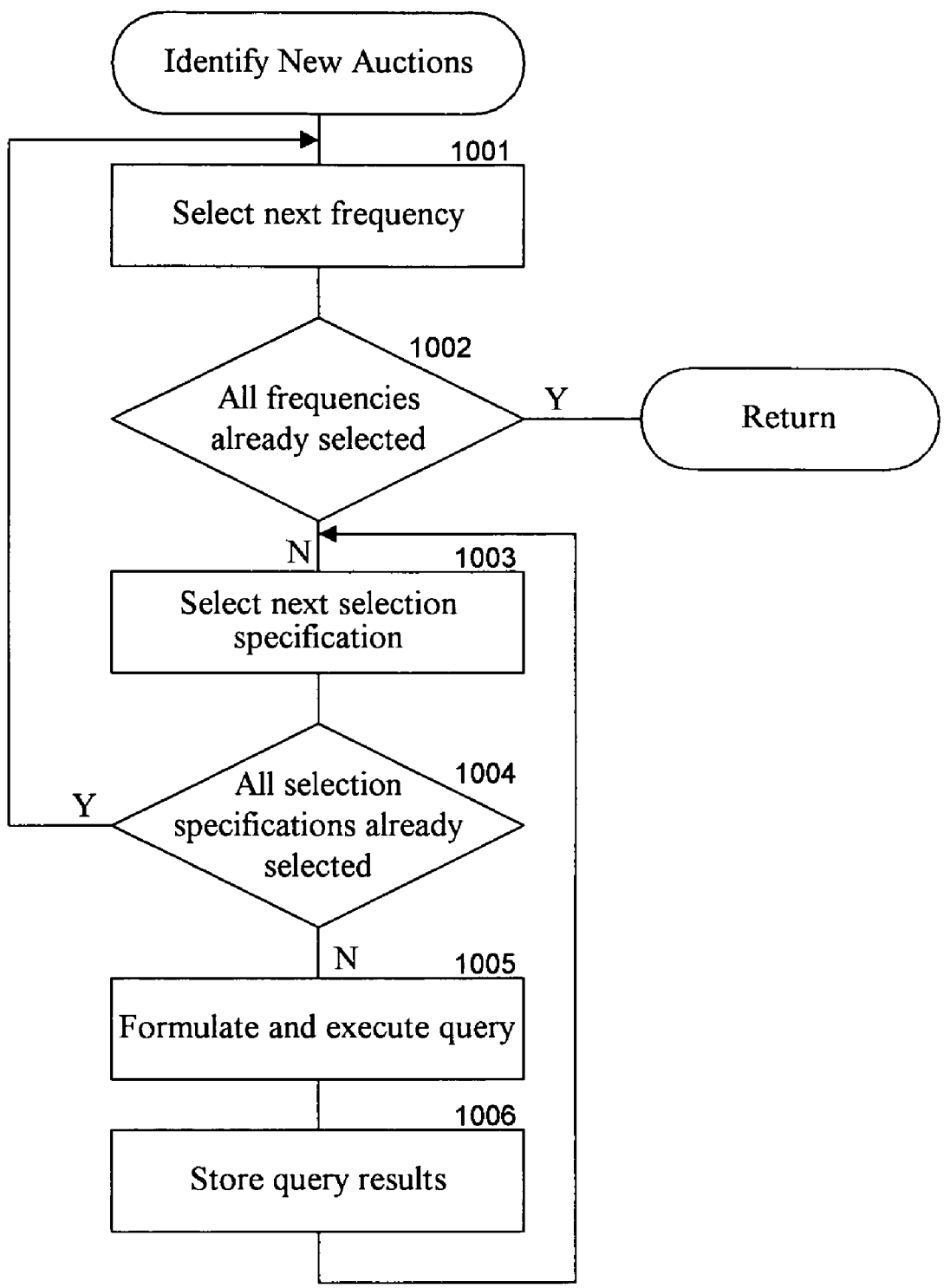
FIG. 10 is a flow diagram illustrating example processing of an identify new auctions function.

FIG. 10 is a flow diagram illustrating example processing of an identify new auctions function. This function formulates a query for each notification request and submits the query to a query engine for the auction database. For example, if the frequency is weekly and the category is "Barbie," then the query may be "category=Barbie and opendate>currentdate−7 and enddate>currentdate." This query selects auctions that were opened in the last 7 days and that will remain open through the current day. The function may formulate the query so that a user is only notified of auctions that will be still open when the notification is received by the user. The function may need to formulate a query for a notification request for each separate notification frequency. For example, on Friday the function may formulate queries that cover the previous day to satisfy a daily frequency and queries that cover the previous 2 days to satisfy a Monday, Wednesday, and Friday frequency. The function may use various optimization techniques. For example, if a query covering that previous week identifies no new auctions, then a query covering the previous day can be assumed to identify no new auctions. Also, if daily queries for the past week identified no new auctions, then a weekly query will identify no new auctions. In step 1001, the function selects the next frequency that is appropriate for the current date. In step 1002, if all the frequencies have already been selected, the function returns, else the function continues at step 1003. In step 1003, the function selects the next selection specification for the selected frequency. In step 1004, if all the selection specifications have already been selected, then the function loops to step 1001 to select the next frequency, else the function continues at step 1005. In step 1005, the function executes a query for the selected selection specification. In step 1006, the function stores the query results that are not empty and loops to step 1003 to select the next selection specification.

Figure 11:
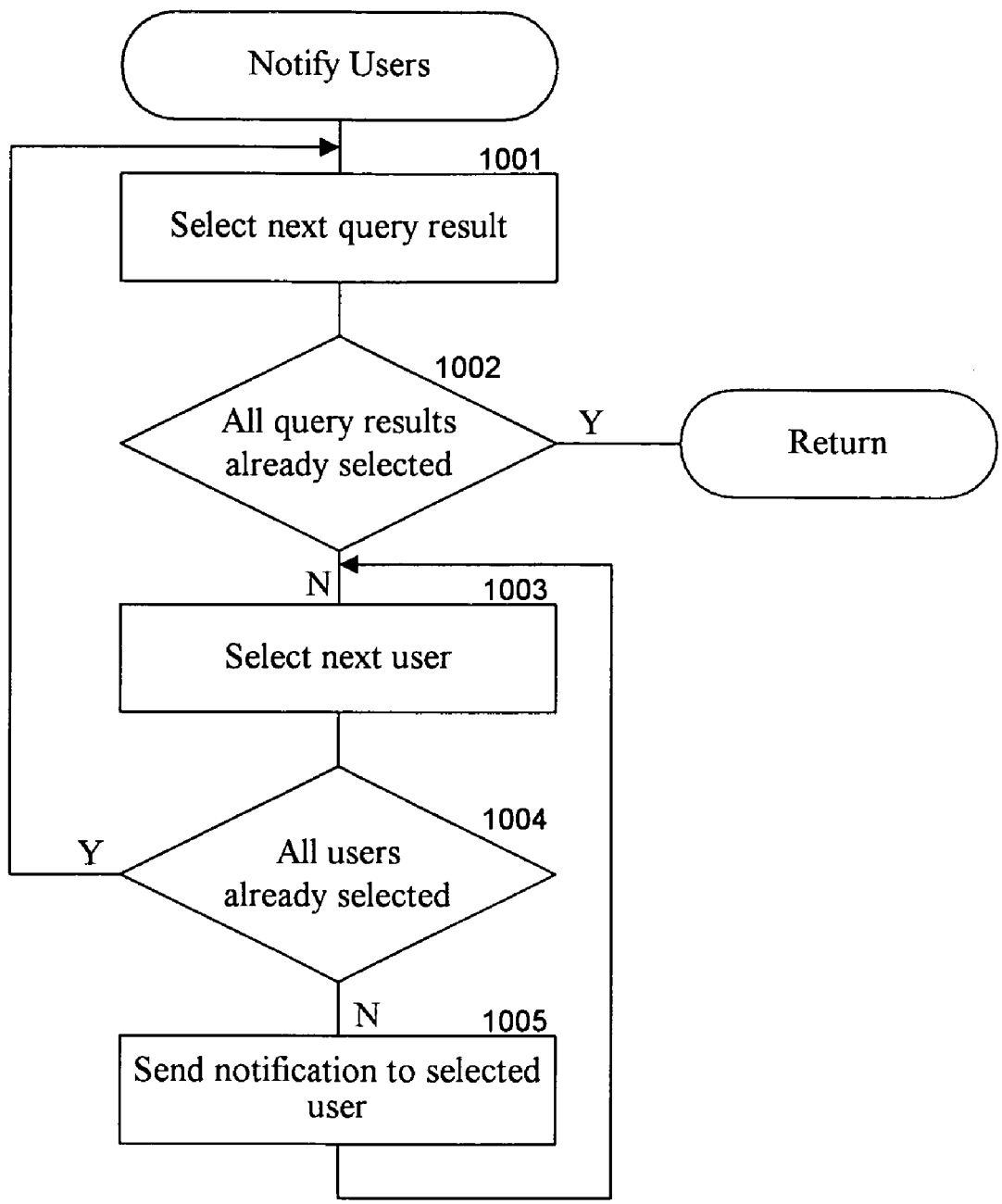
FIG. 11 is a flow diagram illustrating example processing of a notify users function.

FIG. 11 is a flow diagram illustrating example processing of a notify users function. This function selects each query result stored by the identify new auctions function and notifies the users that are mapped to the selection specification for which the query result was generated. In step 1001, the function selects the next query result. In step 1002, if all the query results have already been selected, then the function returns, else the function continues at step 1003. In steps 1003-1005, the function loops selecting each user that is mapped to selection specification for which the selected query result was generated and notifying the selected user of the new auctions. In step 1003, the function selects the next user that is mapped to the selection specification. In step 1004, if all such users have already been selected, then the function loops to step 1001 to select the next query result, else the function continues at step 1005. In step 1005, the function sends a notification to the selected user and then loops to step 1003 to select the next user.

Based upon the above description, it will be appreciated that, although specific embodiments of the invention have been described for purposes of illustration, various modifications may be made without deviating from the spirit and scope of the invention. Accordingly, the invention is not limited except as by the appended claims.

The invention claimed is:

1. A method, comprising the steps of:
   storing a plurality of selection specifications in a server, each of the selection specifications providing at least one search parameter for performing a search for a type of commercial transaction, where at least one user is mapped to each of the selection specifications;

determining whether a new selection specification received in the server from a new user matches one of the selection specifications stored in the server;

associating the new user with one of the selection specifications when the new selection specification matches the one of the selection specifications;

for each selection specification, periodically performing a search in a commercial transaction data store based on the selection specification to identify an existence of at least one previously unidentified commercial transaction for the at least one user mapped to the selection specification; and sending a notification to the at least one user that informs the at least one user of the existence of the at least one previously unidentified commercial transaction.

2. The method of claim 1, further comprising the step of normalizing the new selection specification based upon at least one predefined rule.

3. The method of claim 2, where the new selection specification further comprises a plurality of search terms, and the step of normalizing the new selection specification further comprises the step of placing the search terms in an alphabetical order.

4. The method of claim 2, where the new selection specification further comprises a plurality of search terms, and the step of normalizing the new selection specification further comprises the step of converting the search terms to lower case.

5. The method of claim 2, where the new selection specification further comprises a plurality of search terms, and the step of normalizing the new selection specification further comprises the step of removing noise words from the search terms.

6. The method of claim 1, where the type of commercial transaction further comprises an auction.

7. The method of claim 6, where the step of periodically performing the search in the commercial transaction data store based on the selection specification to identify the existence of at least one previously unidentified commercial transaction for the at least one user mapped to the selection specification further comprises identifying only at least one auction that is open when the notification is sent to the at least one user.

8. The method of claim 1, wherein the search is periodically performed according to at least one schedule associated with the at least one user mapped to the selection specification.

9. The method of claim 8, wherein a plurality of schedules are associated with a corresponding plurality of users mapped to the selection specification, and wherein the search is periodically performed according to the plurality of schedules.

10. The method of claim 9, further comprising the step of consolidating searches performed for at least two of the schedules.

11. The method of claim 1, further comprising the step of:
inputting a period of time into the server; and
terminating the periodic performance of the search after an expiration of the period of time.

12. The method of claim 1, further comprising the step of: specifying a default period of time into the server; and
terminating the periodic performance of the search after an expiration of the default period of time.

13. A system, comprising:
a processor-based system;
logic executable in the processor-based system configured to:

store a plurality of selection specifications, each of the selection specifications providing at least one search parameter for performing a search for a type of commercial transaction, where at least one user is mapped to each of the selection specifications;

determine whether a the new selection specification received in the server from a new user matches one of the selection specifications stored in the server;

associate the new user with one of the selection specifications when the new selection specification matches the one of the selection specifications for each selection specification, periodically perform a search in a commercial transaction data store based on the selection specification to identify an existence of at least one previously unidentified commercial transaction for the at least one user mapped to the selection specification; and send a notification to the at least one user that informs the at least one user of the existence of the at least one previously unidentified commercial transaction.

14. The system of claim 13, wherein the logic executable in the processor-based system is further configured to normalize the new selection specification based upon at least one predefined rule.

15. The system of claim 14, wherein the new selection specification further comprises a plurality of search terms, and the new selection specification is normalized by placing the search terms in an alphabetical order.

16. The system of claim 14, wherein the new selection specification further comprises a plurality of search terms, and the new selection specification is normalized by converting the search terms to lower case.

17. The system of claim 14, where the new selection specification further comprises a plurality of search terms, and the new selection specification is normalized by removing noise words from the search terms.

18. The system of claim 13, where the type of commercial transaction further comprises an auction.

19. The system of claim 18, wherein the search identifies only at least one auction that is open when the notification is sent to the at least one user.

20. The system of claim 13, further comprising:
at least one schedule associated with the at least one user mapped to the selection specification; and
wherein the search is periodically performed according to the at least one schedule.

21. The system of claim 13, further comprising:
wherein the at least one user further comprises a plurality of users mapped to the selection specification;
a plurality of schedules, each schedule being associated with a corresponding one of the users and
wherein the search is periodically performed according to the plurality of schedules.

22. The system of claim 21, wherein the logic executable in the processor-based system is further configured to consolidate searches performed for at least two of the schedules.

23. The system of claim 13, wherein the logic executable in the processor-based system is further configured to:
input a period of time via user input device; and
terminate the periodic performance of the search after an expiration of the period of time.

24. The system of claim 13, wherein the logic executable in the processor-based system is further configured to terminate the periodic performance of the search after an expiration of a default period of time.

* * * * *

UNITED STATES PATENT AND TRADEMARK OFFICE
CERTIFICATE OF CORRECTION

PATENT NO.         : 7,542,978 B2
APPLICATION NO. : 10/337439
DATED              : June 2, 2009
INVENTOR(S)        : Ruben E. Ortega and Alexandre Edelman It is certified that error appears in the above-identified patent and that said Letters Patent is hereby corrected as shown below:

In Column 9, Line 14, a line return should be inserted after the word "and," which would cause the following paragraph to begin with the word "sending."

In Column 10, Line 6, delete the word "the" that appears between the words "a" and "new."

In Column 10, Line 51, insert a semicolon --;-- between the words "users" and "and."

Signed and Sealed this

Fifteenth Day of September, 2009

David J. Kappos
*Director of the United States Patent and Trademark Office*